United States Patent
Kameda et al.

(10) Patent No.: US 8,224,063 B2
(45) Date of Patent: Jul. 17, 2012

(54) INSPECTION APPARATUS AND INSPECTION METHOD

(75) Inventors: Akira Kameda, Osaka (JP); Atsushi Katayama, Kyoto (JP); Ryuji Hamada, Osaka (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 12/678,526

(22) PCT Filed: Sep. 19, 2008

(86) PCT No.: PCT/JP2008/002586
§ 371 (c)(1), (2), (4) Date: Mar. 17, 2010

(87) PCT Pub. No.: WO2009/041005
PCT Pub. Date: Apr. 2, 2009

(65) Prior Publication Data
US 2010/0195897 A1    Aug. 5, 2010

(30) Foreign Application Priority Data

Sep. 28, 2007 (JP) ................................. 2007-256084

(51) Int. Cl.
*G06K 9/00* (2006.01)
(52) U.S. Cl. .................. 382/151; 356/399; 356/401
(58) Field of Classification Search ............ 382/151, 382/144; 356/399–401
See application file for complete search history.

(56) References Cited

U.S. PATENT DOCUMENTS

| | | | |
|---|---|---|---|
| 4,922,434 A * | 5/1990 | Fule | 700/259 |
| 5,214,492 A * | 5/1993 | LoBianco et al. | 356/400 |
| 5,671,527 A * | 9/1997 | Asai et al. | 29/740 |
| 5,854,745 A | 12/1998 | Muraoka et al. | |
| 5,858,806 A | 1/1999 | Nishida | |
| 6,320,977 B1 | 11/2001 | Tokura | |
| 2009/0252400 A1* | 10/2009 | Iwase | 382/141 |

FOREIGN PATENT DOCUMENTS

| | | |
|---|---|---|
| JP | 3-288279 | 12/1991 |
| JP | 7-273497 | 10/1995 |
| JP | 8-128811 | 5/1996 |
| JP | 8-330393 | 12/1996 |
| JP | 2005-332238 | 12/2005 |
| JP | 2005-346232 | 12/2005 |

OTHER PUBLICATIONS

International Search Report issued Dec. 9, 2008 in International (PCT) Application No. PCT/JP2008/002586.

* cited by examiner

*Primary Examiner* — Tarifur Chowdhury
*Assistant Examiner* — Isiaka Akanbi
(74) *Attorney, Agent, or Firm* — Wenderoth, Lind & Ponack, LLP.

(57) ABSTRACT

An inspection apparatus and method for precisely detect an amount of misalignment of a component mounted on a panel through an adhesive which contains conductive particles. The inspection apparatus detects an amount of misalignment, from a predetermined mounting position, of a component mounted on a surface of a panel through an ACF, and includes: a visible light camera which captures an image of a panel recognition mark formed on the panel and a component recognition mark formed on the component; an obtaining unit which obtains, from the image captured by the camera, positions of feature points of the respective recognition marks; and a calculation unit which calculates an amount of misalignment of the feature point of the component recognition mark in the image captured by the camera from a predetermined position that is determined using the position of the feature point of the panel recognition mark as a reference.

4 Claims, 10 Drawing Sheets

FIG. 6
(a)
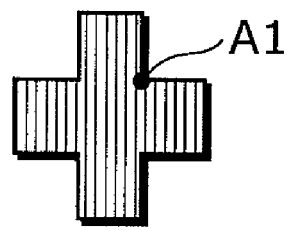
(b)
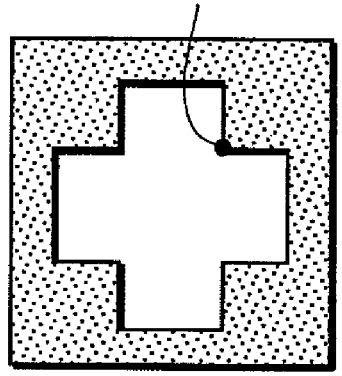
(c)
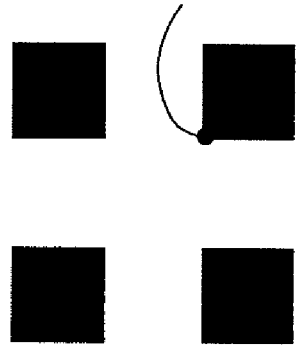
(d)
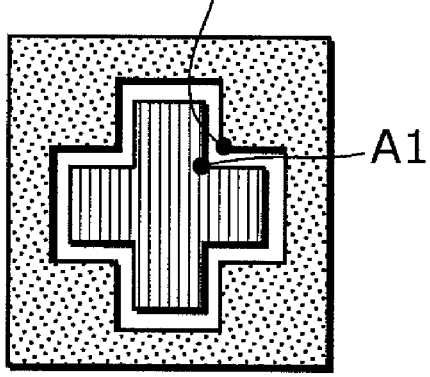
(e)
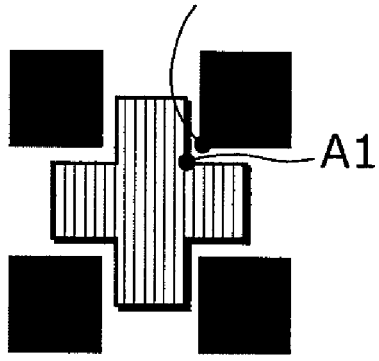

INSPECTION APPARATUS AND INSPECTION METHOD

TECHNICAL FIELD

The present invention relates to inspection apparatuses and inspection methods, and particularly to an inspection apparatus and an inspection method for inspecting a mounting status of an electronic component mounted on a substrate.

BACKGROUND ART

Conventionally, electronic components (hereinafter referred to as components), such as tape automated bonding (TAB) substrates, semiconductor elements, and flexible substrates which have an electrode, are mounted on flat panel displays (hereinafter referred to as panels) such as liquid crystal displays and plasma displays which have an electrode made of indium tin oxide (ITO) and the like.

This mounting involves temporary and permanent compression-bonding of a component to a panel while providing an anisotropic conductive film (hereinafter referred to as an ACF) between the component and the panel, so as to bond the electrode of the panel (hereinafter referred to as a panel electrode) and the electrode of the component (hereinafter referred to as a component electrode). The temporary compression-bonding involves softly pressing the component using a thermocompression-bonding head, and the permanent compression-bonding following the temporary compression-bonding involves pressing the temporary compression-bonded component using a thermocompression-bonding head under a pressure and a temperature higher than in the temporal compression-bonding. Then, an amount of relative misalignment (amount of misalignment) of the component from a predetermined mounting position is detected by an inspection apparatus. The detected amount of misalignment is provided as feedback for the next mounting of a component on the panel, and the mounting is performed in which the misalignment is corrected.

An example of the inspection apparatus which detects the amount of component misalignment is one disclosed in Patent Reference 1. The inspection apparatus disclosed in Patent Reference 1 detects an amount of component misalignment by detecting an amount of misalignment of the panel electrode and the component electrode (bump).

Patent Reference 1: Japanese Unexamined Patent Application Publication No. 08-330393

DISCLOSURE OF INVENTION

Problems that Invention is to Solve

With the inspection apparatus disclosed in Patent Reference 1, the positions of the panel electrode and the component electrode are calculated by an operator based on an image of the panel electrode and the component electrode captured by an imaging apparatus which is provided on the side of the panel's bottom surface (the surface of the panel, which is a transparent substrate, on which the component of the panel is not mounted). Thus, with this inspection apparatus, it is very difficult to precisely detect an amount of misalignment of a component mounted on the panel through an adhesive, such as the ACF, which contains conductive particles. That is to say, light does not pass or does not easily pass through the conductive particles such as a metal, and thus light from the component electrode does not easily reach the imaging apparatus provided on the panel's bottom surface side, making it impossible to capture an image of the entire component electrode. As a consequence, the operator cannot easily recognize the position of the component electrode, resulting in inability to precisely calculate the amount of misalignment. When the mounting pitch of components becomes narrower, the conductive particles become smaller and denser, making it more likely for the light to be shielded by the conductive particles, which means that it is more difficult for the light to reach the imaging apparatus. As a result, it is difficult to recognize the component electrode through the conductive particles, and thus the problem becomes more significant when the mounting pitch becomes narrower.

In view of the above problem, an object of the present invention is to provide an inspection apparatus and an inspection method for precisely detecting an amount of misalignment of a component mounted on a panel through an adhesive which contains conductive particles.

Means to Solve the Problems

To achieve the above object, the inspection apparatus according to an aspect of the present invention is an inspection apparatus which detects an amount of misalignment, from a predetermined mounting position, of a component mounted on a surface of a panel through an adhesive which contains conductive particles, the inspection apparatus including: a camera which captures an image of a panel recognition mark formed on the panel and a component recognition mark formed on the component; an obtaining unit configured to obtain, from the image captured by the camera, a position of a feature point of the panel recognition mark and a position of a feature point of the component recognition mark; and a calculation unit configured to calculate an amount of misalignment of the feature point of one of the panel recognition mark and the component recognition mark in the image from a predetermined position that is determined using the position of the feature point of the other one of the recognition marks as a reference.

With this, the inspection apparatus calculates an amount of component misalignment based on the captured image of the panel recognition mark and the component recognition mark. This makes it possible to precisely detect the amount of misalignment of the component mounted on the panel through the adhesive containing the conductive particles.

Here, the inspection apparatus further may include: a determination unit configured to determine whether or not the feature point of the panel recognition mark and the feature point of the component recognition mark are recognizable in the image; and a correction unit configured to correct the image when the determination unit determines that the feature points are not recognizable, wherein the obtaining unit may be configured to obtain the positions of the feature points from either the image for which the determination unit has determined that the feature points are recognizable or the image corrected by the correction unit.

Further, when the determination unit determines that the feature points are not recognizable, the correction unit may be configured to delete the conductive particles from the image and perform either linear interpolation or curve interpolation of a part of the image from which the conductive particles have been deleted.

With this, even when the feature points cannot be recognized due to the conductive particles, the image correction makes the feature points obtainable. Since the calculation of the amount of component misalignment is free from the impact of the conductive particles, it is possible to reliably detect the amount of misalignment of the component mounted on the panel through the conductive particles.

Furthermore, the determination unit may be configured to sequentially determine whether or not any of a plurality of feature points of the one of the recognition marks is recognizable in the image, and the correction unit may be configured to correct the image when the determination unit determines that none of the plurality of feature points is recognizable.

Moreover, the determination unit may be configured to divide the image into a plurality of areas each including the panel recognition mark and the component recognition mark, and sequentially determine whether or not the feature points are recognizable in the plurality of areas, and the correction unit may be configured to perform the correction on at least one of the plurality of areas when the determination unit determines that the feature points are not recognizable in any of the plurality of areas.

With thus, the correction of only a part of the captured image makes the feature points obtainable, thereby making it possible to easily detect the amount of misalignment of the component mounted on the panel through the conductive particles.

The inspection apparatus further includes an illuminator which illuminates the panel recognition mark and the component recognition mark with light having a wavelength that allows the light to pass through the panel but does not allow or does not easily allow the light to pass through the conductive particles, wherein the camera is provided on a bottom surface side of the panel which is opposite to a side of the panel on which the component is mounted, and the calculation unit is configured to calculate the amount of misalignment of the feature point of the component recognition mark in the image from a predetermined position that is determined using the position of the feature point of the panel recognition mark as a reference.

Further, the camera may be a visible light camera, and the illuminator may be a visible light illuminator.

With this, a special illuminator and a special camera are not necessary, thereby preventing increase in the size and complication of the apparatus.

The present invention can also be realized as an inspection method for detecting an amount of misalignment, from a predetermined mounting position, of a component mounted on a surface of a panel through an adhesive which contains conductive particles, the inspection method including: capturing, by a camera, an image of a panel recognition mark formed on the panel and a component recognition mark formed on the component; obtaining, from the image captured by the camera in the capturing, a position of a feature point of the panel recognition mark and a position of a feature point of the component recognition mark; and calculating an amount of misalignment of the feature point of one of the panel recognition mark and the component recognition mark in the image from a predetermined position that is determined using the position of the feature point of the other one of the recognition marks as a reference.

This method makes it possible to precisely detect the amount of misalignment of the component mounted on the panel through the adhesive containing the conductive particles.

Effects of the Invention

The present invention provides an inspection apparatus and an inspection method for precisely detecting an amount of misalignment of a component mounted on a panel through an adhesive which contains conductive particles.

BRIEF DESCRIPTION OF DRAWINGS

FIG. 6 The part (a) of FIG. 6 shows an example of a component recognition mark. The part (b) of FIG. 6 shows an example of a panel recognition mark. The part (c) of FIG. 6 shows an example of a panel recognition mark. The part (d) of FIG. 6 shows an example of a component recognition mark and a panel recognition mark. The part (e) of FIG. 6 shows an example of a component recognition mark and a panel recognition mark.

| | Numerical References |
|---|---|
| 100 | Component mounting system |
| 101, 106 | Loader |
| 102 | Washer |
| 103a, 103b | Panel mounter |
| 104 | Component supplying unit |
| 105 | Inspector |
| 108 | Line controller |
| 109 | Communication cable |
| 113 | ACF adhering apparatus |
| 114 | Temporary compression-bonding apparatus |
| 115, 116 | Permanent compression-bonding apparatus |
| 200 | Panel |
| 201 | Component |
| 202, 204, 206 | Thermocompression-bonding head |
| 203, 205, 207, 301 | Back-up stage |
| 210 | ACF |
| 211 | Conductive particles |
| 300 | Mounting-completed panel |
| 302 | Panel transfer stage unit |
| 303 | Under-panel transfer shaft unit |
| 304 | Visible light illuminator |
| 306 | Visible light camera |
| 410, 430, 440 | Control unit |
| 411, 431, 441 | Storage unit |
| 411a | Master table |
| 412, 432, 442 | Input unit |
| 413, 433, 443 | Display unit |

-continued

| Numerical References | |
|---|---|
| 414, 434, 444 | Communication I/F unit |
| 415 | Operation unit |
| 431a | Feedback data |
| 435, 445 | Mechanical unit |
| 436 | Data updating unit |
| 441a | Inspection position data |
| 441b | Feature point data |
| 446 | Amount-of-misalignment calculation unit |
| 447 | Correction unit |
| 448 | Obtaining unit |
| 449 | Determination unit |

BEST MODE FOR CARRYING OUT THE INVENTION

Hereinafter, a component mounting system according to an embodiment of the present invention is described with reference to the drawings.

Figure 1:
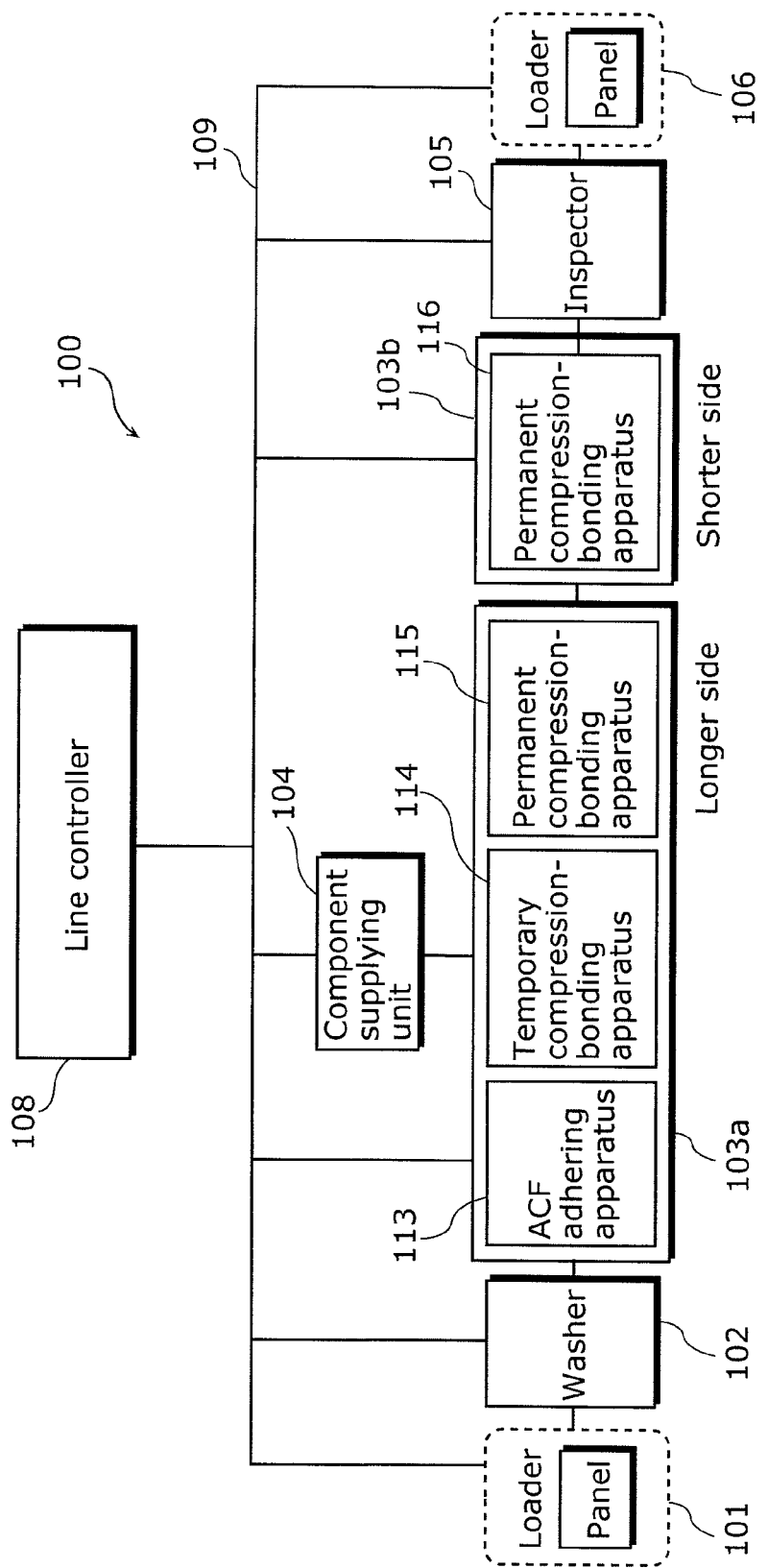
FIG. 1 is a conceptual diagram showing an entire configuration of a component mounting system according to an embodiment of the present invention.

FIG. 1 is a conceptual diagram showing an entire configuration of a component mounting system 100 of the present embodiment.

The component mounting system 100 includes a line including: a loader 101; a washer 102; two panel mounters 103a and 103b; a component supplying unit 104; an inspector 105; and a loader 106, a line controller 108, and a communication cable 109.

The loader 101 supplies a panel to the line. The washer 102 washes a part of the panel supplied by the loader 101, where the ACF is to be adhered. The two panel mounters 103a and 103b mount components on different sides of the panel. The component supplying unit 104 supplies a component to the panel mounter 103a. The inspector 105 detects an amount of relative misalignment (amount of misalignment) of a component mounted on the top surface of the panel through the ACF, from a predetermined mounting position of the component. The loader 106 ejects the panel on which the components have been mounted (hereinafter referred to as a mounting-completed panel). The line controller 108 manages and controls communication and so on of various data and the operating status of the line as a whole. The communication cable 109 connects the line controller 108 with each element of the line.

The panel mounter 103a includes an ACF adhering apparatus 113, a temporary compression-bonding apparatus 114, and a permanent compression-bonding apparatus 115. The ACF adhering apparatus 113 applies an ACF to a longer side and a shorter side of the panel's top surface. The temporary compression-bonding apparatus 114 places a component using a thermocompression-bonding head, and presses the component to temporarily compression-bond the component to the panel's top surface. The permanent compression-bonding apparatus 115 presses the component, which has been temporarily compression-bonded to the longer side of the panel's top surface, using a thermocompression-bonding head under a pressure and a temperature higher than in the temporal compression-bonding, so as to permanently compression-bond the component to the panel's top surface.

The panel mounter 103b includes a permanent compression-bonding apparatus 116. The permanent compression-bonding apparatus 116 presses the component, which has been temporarily compression-bonded to the shorter side of the panel's top surface, using a thermocompression-bonding head under a pressure and a temperature higher than in the temporal compression-bonding, so as to permanently compression-bond the component to the panel's top surface.

Figure 2:
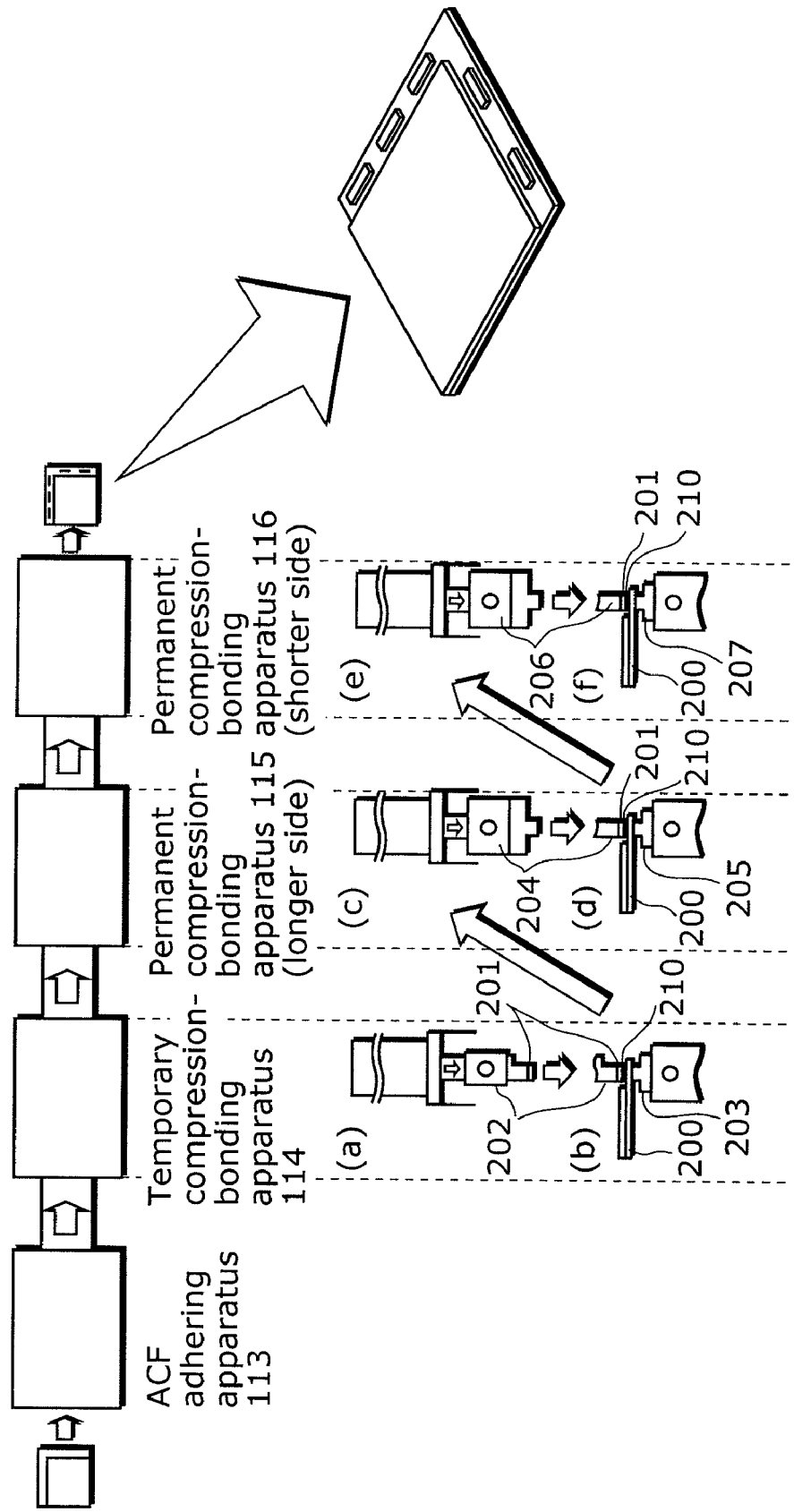
FIG. 2 shows how panel mounters of the component mounting system mount components on a panel.

FIG. 2 shows how the panel mounters 103a and 103b mount components on the panel.

First, the ACF adhering apparatus 113 applies an ACF 210 to a region, at the edges of the top surface of a panel 200, in which components are to be mounted, and then transfers the panel 200 to the temporary compression-bonding apparatus 114.

Next, the temporary compression-bonding apparatus 114 lowers a thermocompression-bonding head 202 holding a component 201 ((a) in FIG. 2), and temporarily compression-bonds the component 201 to the region of the top surface of the panel 200 placed on a back-up stage 203, to which the ACF 210 has been adhered ((b) in FIG. 2).

Next, after the panel 200 is transferred to the permanent compression-bonding apparatus 115, the permanent compression-bonding apparatus 115 lowers a thermocompression-bonding head 204 ((c) in FIG. 2) and permanently compression-bonds the component 201 which has been temporarily compression-bonded to the longer side of the top surface of the panel 200 placed on a back-up stage 205 ((d) in FIG. 2).

Lastly, after the panel 200 is transferred to the permanent compression-bonding apparatus 116, the permanent compression-bonding apparatus 116 lowers a thermocompression-bonding head 206 ((e) in FIG. 2) and permanently compression-bonds the component 201 which has been temporarily compression-bonded to the shorter side of the top surface of the panel 200 placed on a back-up stage 207 ((f) in FIG. 2).

Figure 3:
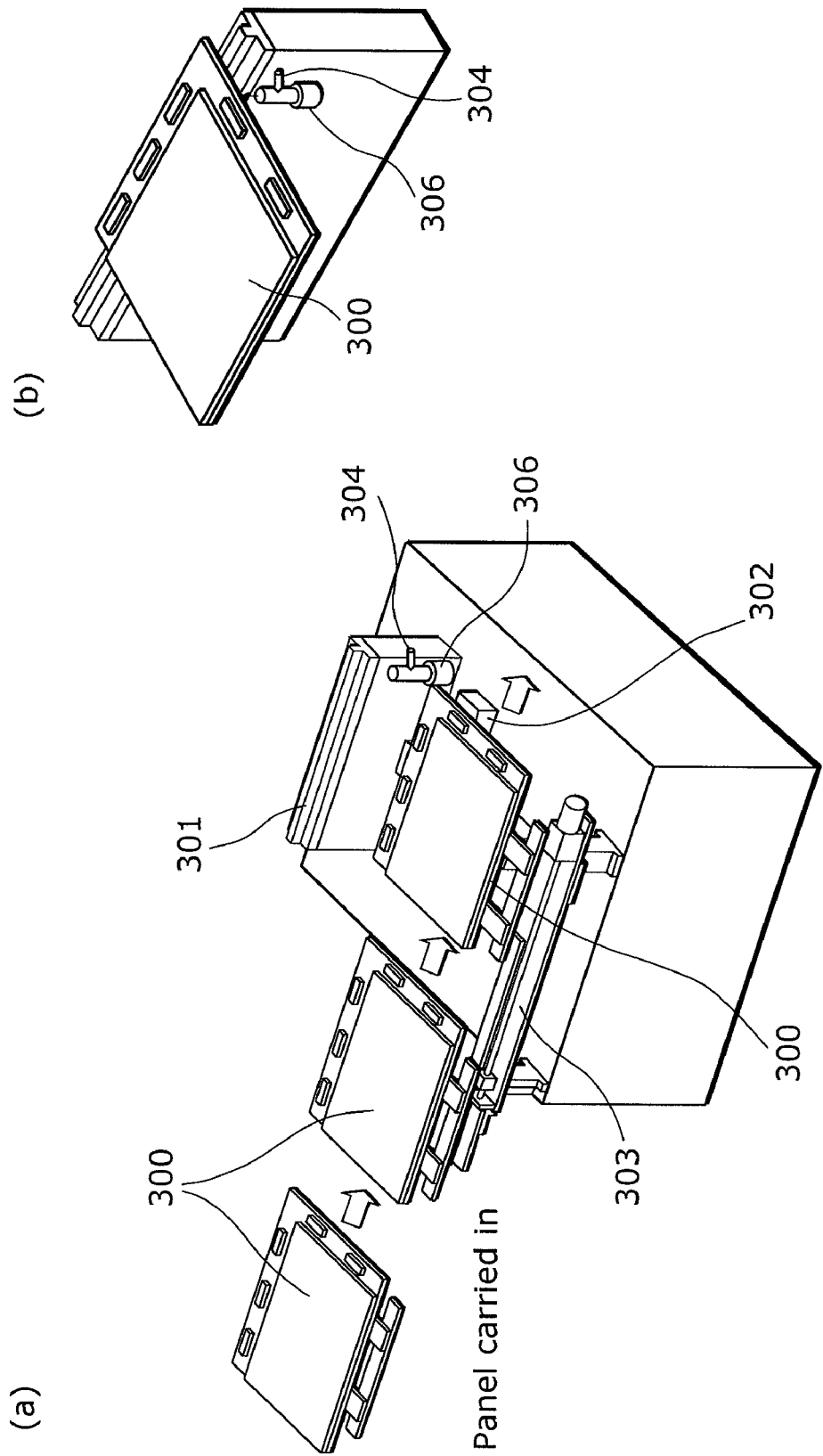
FIG. 3 The part (a) of FIG. 3 is a perspective view showing a schematic configuration of an inspector of the component mounting system. The part (b) of FIG. 3 shows how an inspector of the component mounting system inspects a mounting-completed panel.

The part (a) of FIG. 3 is a perspective view showing a schematic configuration of the inspector 105, and the part (b) of FIG. 3 shows how the inspector 105 inspects a mounting-completed panel 300.

The inspector 105 includes a back-up stage 301, a panel transfer stage unit 302, an under-panel transfer shaft unit 303, a visible light illuminator 304, and a visible light camera 306.

The mounting-completed panel 300 is placed on the back-up stage 301. The panel transfer stage unit 302 transfers the mounting-completed panel 300 to the back-up stage 301. The under-panel transfer shaft unit 303 transfers the mounting-completed panel 300 to the panel transfer stage unit 302.

The visible light illuminator 304 is provided on the side of the bottom surface of the mounting-completed panel 300 (the surface of the mounting-completed panel 300 on which the components are not mounted), and illuminates the bottom surface of the mounting-completed panel 300 with visible light. The mounting-completed panel 300 is transparent to the visible light, and thus the visible light from the visible light illuminator 304 passes through the mounting-completed panel 300 to illuminate the entire surface of a panel recognition mark formed on the top surface of the mounting-completed panel 300 (the surface of the mounting-completed panel 300 on which the components are mounted). On the other hand, the visible light does not pass or does not easily pass through conductive particles contained in the ACF. Thus, the visible light from the visible light illuminator 304 only illuminates a part of a component recognition mark formed on the component's top surface (the surface of the component bonded to the panel). Here, the panel is primarily made of glass, the panel recognition mark and the component recognition mark are primarily made of Al, and the surface of the conductive particles is primarily made of Ni.

The visible light camera 306 is provided on the bottom surface side of the mounting-completed panel 300 which is opposite to the side of the mounting-completed panel 300 on which the components are mounted. The visible light camera 306 captures an image of the panel recognition mark and the component recognition mark which are illuminated with the visible light.

Figure 4:
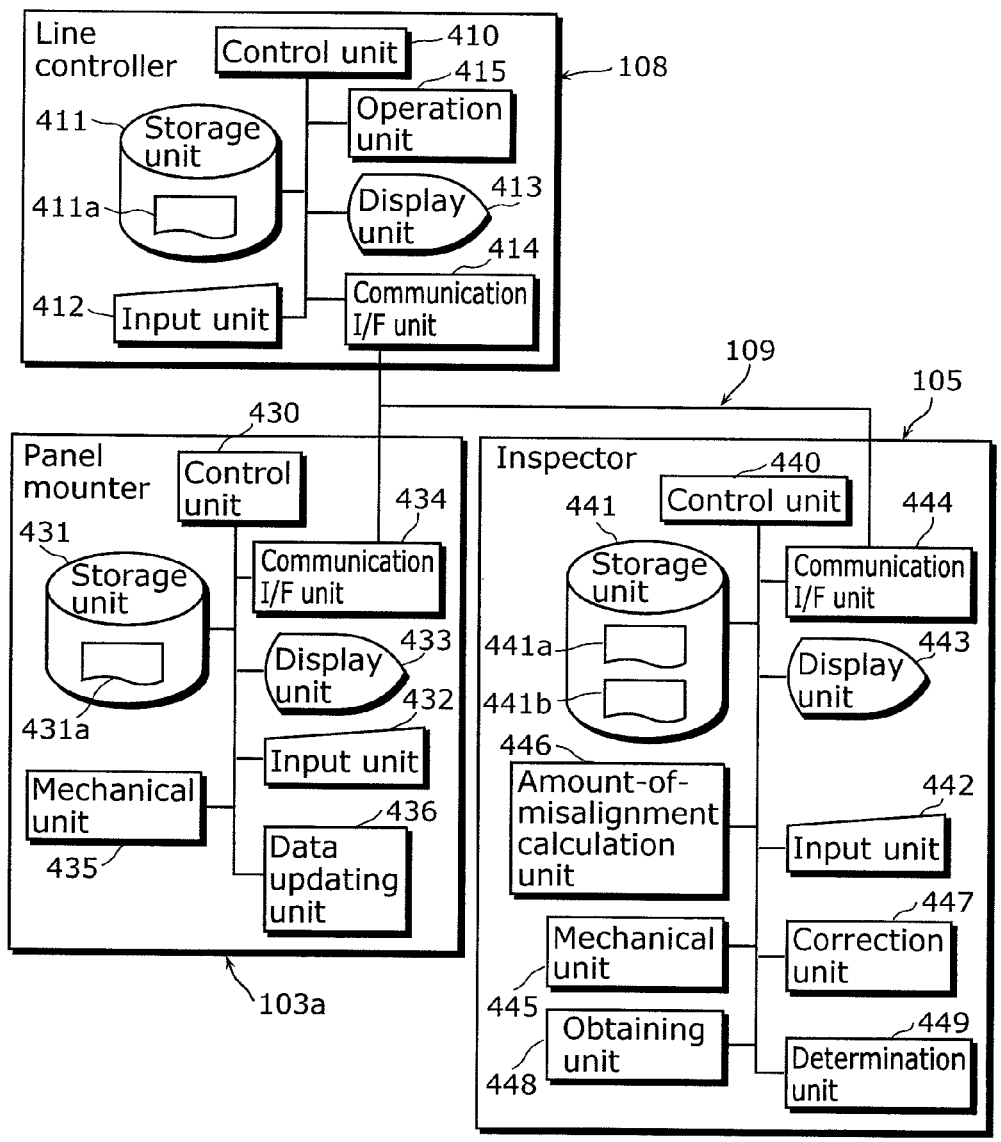
FIG. 4 is a functional block diagram showing a schematic configuration of the component mounting system.

FIG. 4 is a functional block diagram showing a schematic configuration of the component mounting system 100.

The line controller 108 includes a control unit 410, a storage unit 411, an input unit 412, a display unit 413, a communication I/F unit 414, and an operation unit 415.

According to an instruction or the like from an operator, the control unit 410 executes line control data stored in the storage unit 411, and controls each unit based on the execution result.

The storage unit 411 is a hard disk and a memory, for example, and holds line control data, a master table 411a, and so on. The master table 411a contains information indicating an associated pair of a mounting position and an amount of correction (feedback amount).

The input unit 412 is a keyboard and a mouse, for example, and the display unit 413 is a cathode-ray tube (CRT), a liquid crystal display (LCD), and the like. These units are used for communication and so on between the line controller 108 and the operator.

The communication I/F unit 414 is a local area network (LAN) adapter, for example, and is used for communication and so on between: the line controller 108; and the panel mounter 103a and the inspector 105.

The operation unit 415 calculates an amount of correction based on the amount of component misalignment calculated by the inspector 105, and updates the master table 411a stored in the storage unit 411.

The panel mounter 103a includes a control unit 430, a storage unit 431, an input unit 432, a display unit 433, a communication I/F unit 434, a mechanical unit 435, and a data updating unit 436.

According to an instruction or the like from the operator, the control unit 430 executes NC data stored in the storage unit 431, and controls each unit based on the execution result.

The storage unit 431 is a hard disk and a memory, for example, and holds NC data, feedback data 431a, and so on. The feedback data 431a contains information indicating an associated pair of a mounting position and an amount of correction.

The input unit 432 is a keyboard and a mouse, for example, and the display unit 433 is a CRT, an LCD, and the like. These units are used for communication and so on between the panel mounter 103a and the operator.

The communication I/F unit 434 is a LAN adapter, for example, and is used for communication and so on between the panel mounter 103a and the line controller 108.

The mechanical unit 435 is a set of mechanical components including a thermocompression-bonding head, a transport unit, an arm, an XY table, a component supplying unit, a motor which drives these components, and a motor controller, for example.

The data updating unit 436 updates the feedback data 431a stored in the storage unit 431 based on the master table 411a transmitted by the line controller 108.

The inspector 105 includes a control unit 440, a storage unit 441, an input unit 442, a display unit 443, a communication I/F unit 444, a mechanical unit 445, an amount-of-misalignment calculation unit 446, a correction unit 447, an obtaining unit 448, and a determination unit 449.

According to an instruction or the like from the operator, the control unit 440 executes NC data stored in the storage unit 441, and controls each unit based on the execution result.

The storage unit 441 is a hard disk and a memory, for example, and holds NC data, inspection position data 441a, feature point data 441b, and so on. The inspection position data 441a is a set of information indicating all positions to be inspected by the inspector 105. The feature point data 441b is information about a feature point of the component recognition mark.

The input unit 442 is a keyboard and a mouse, for example, and the display unit 443 is a CRT, an LCD, and the like. These units are used for communication and so on between the inspector 105 and the operator.

The communication I/F unit 444 is a LAN adapter, for example, and is used for communication and so on between the inspector 105 and the line controller 108.

The mechanical unit 445 is a set of mechanical components including a panel transfer stage unit, an under-panel transfer shaft unit, a visible light illuminator, a visible light camera, a motor which drives these components, and a motor controller, for example.

The amount-of-misalignment calculation unit 446 is an example of the calculation unit of the present invention, and calculates an amount of misalignment of a predetermined feature point of the component recognition mark, from a predetermined position that is determined using, as a reference, the position of a feature point of the panel recognition mark in the image captured by the visible light camera.

The correction unit 447 is an example of the correction unit of the present invention. When the determination unit 449 determines that a predetermined feature point cannot be recognized in the image captured by the visible light camera, the correction unit 447 corrects the image through either linear interpolation or curve interpolation, and further corrects the image through binarization so as to make the feature point recognizable. More specifically, the correction unit 447 deletes conductive particles from the image captured by the visible light camera, performs linear interpolation or curve interpolation to interpolate a part of the image, the outline of which has become unclear due to the deletion of the conductive particles, and further performs binarization.

The obtaining unit 448 is an example of the obtaining unit of the present invention, and obtains, from the image captured by the visible light camera, a position of a predetermined feature point of the panel recognition mark and a position of a predetermined feature point of the component recognition mark.

The determination unit 449 is an example of the determination unit of the present invention, and determines whether or not predetermined feature points of the panel recognition mark and the component recognition mark are recognizable in the image captured by the visible light camera.

Figure 5:
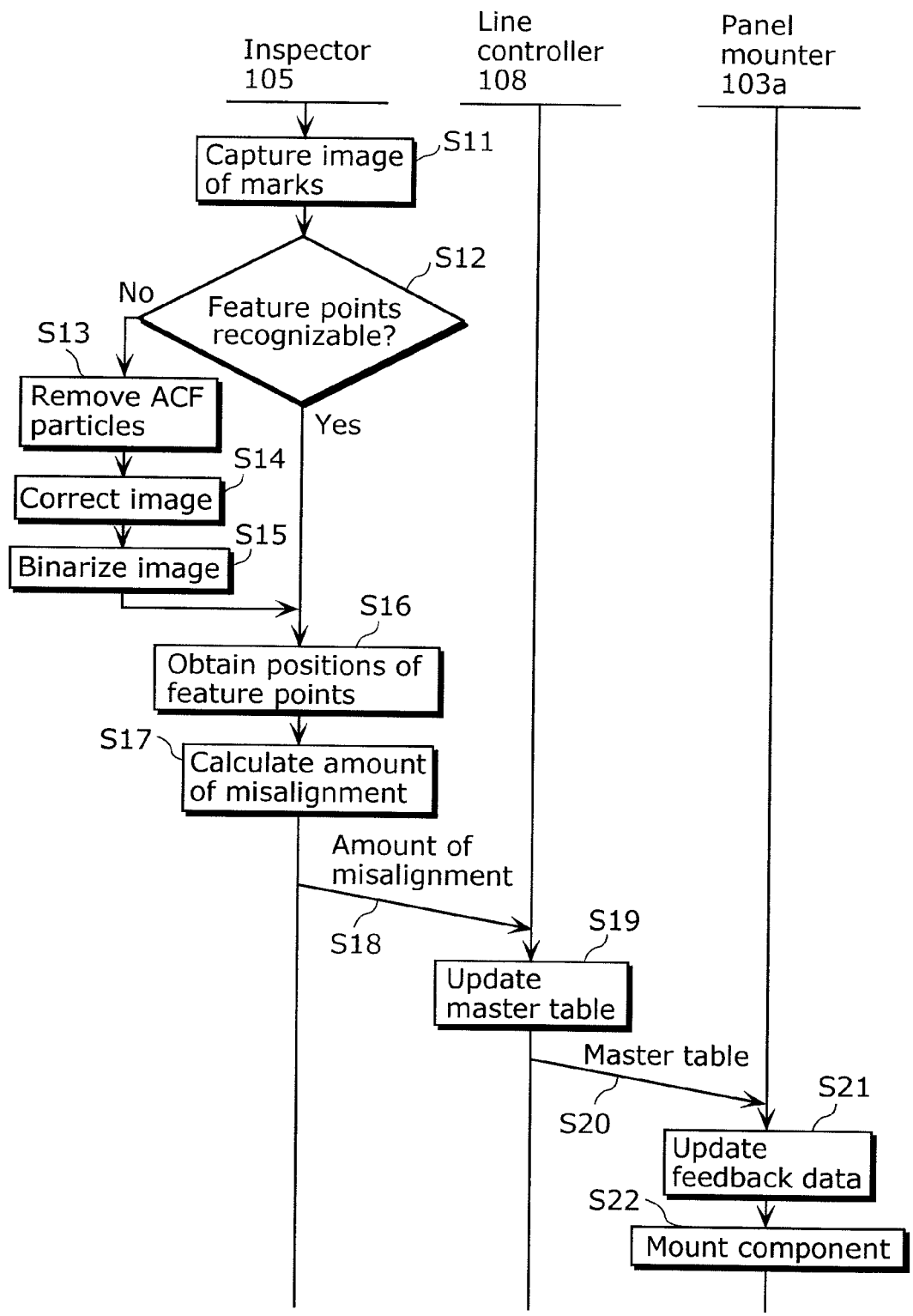
FIG. 5 shows a sequence of a feedback operation performed by the component mounting system.

Next, a feedback operation (providing feedback of an amount of component misalignment for the component mounting) performed by the component mounting system 100 is described in detail. FIG. 5 shows a sequence of the feedback operation performed by the component mounting system 100.

First, the control unit 440 of the inspector 105 causes the mechanical unit 445 to capture an image of the panel recognition mark of the mounting-completed panel 300 and the component recognition mark of the component (Step S11). To be more specific, the control unit 440 of the inspector 105 causes the visible light illuminator 304 to illuminate with visible light the panel recognition mark and the component recognition mark formed at positions indicated in the inspection position data 441a, from the bottom surface side of the mounting-completed panel 300 which is opposite to the side of the mounting-completed panel 300 on which the components are mounted; and causes the visible light camera 306 to capture an image of the panel recognition mark and the component recognition mark from the bottom surface side of the mounting-completed panel 300 which is opposite to the side of the mounting-completed panel 300 on which the components are mounted.

Next, the control unit 440 of the inspector 105 causes the determination unit 449 to determine whether or not the captured image is a favorable image, that is, whether or not the image clearly shows the outlines of the respective recognition marks and the feature points of the respective recognition marks are recognizable (Step S12).

For example, assume that a component recognition mark as shown in the part (a) of FIG. 6 is formed on the component, a panel recognition mark as shown in the part (b) or (c) of FIG. 6 is formed on the panel, and when the component is mounted at a predetermined mounting position on the panel, the component recognition mark and the panel recognition mark have such a positional relationship as shown in the part (d) or (e) of FIG. 6. In this case, assuming that the feature point data 441*b* indicates, as feature points, an edge (corner) A1 at which straight lines constituting the outline of the component recognition mark intersect and an edge (corner) A2 at which straight lines constituting the outline of the panel recognition mark intersect, it is determined whether or not the edges A1 and A2 are recognizable.

Figure 7:
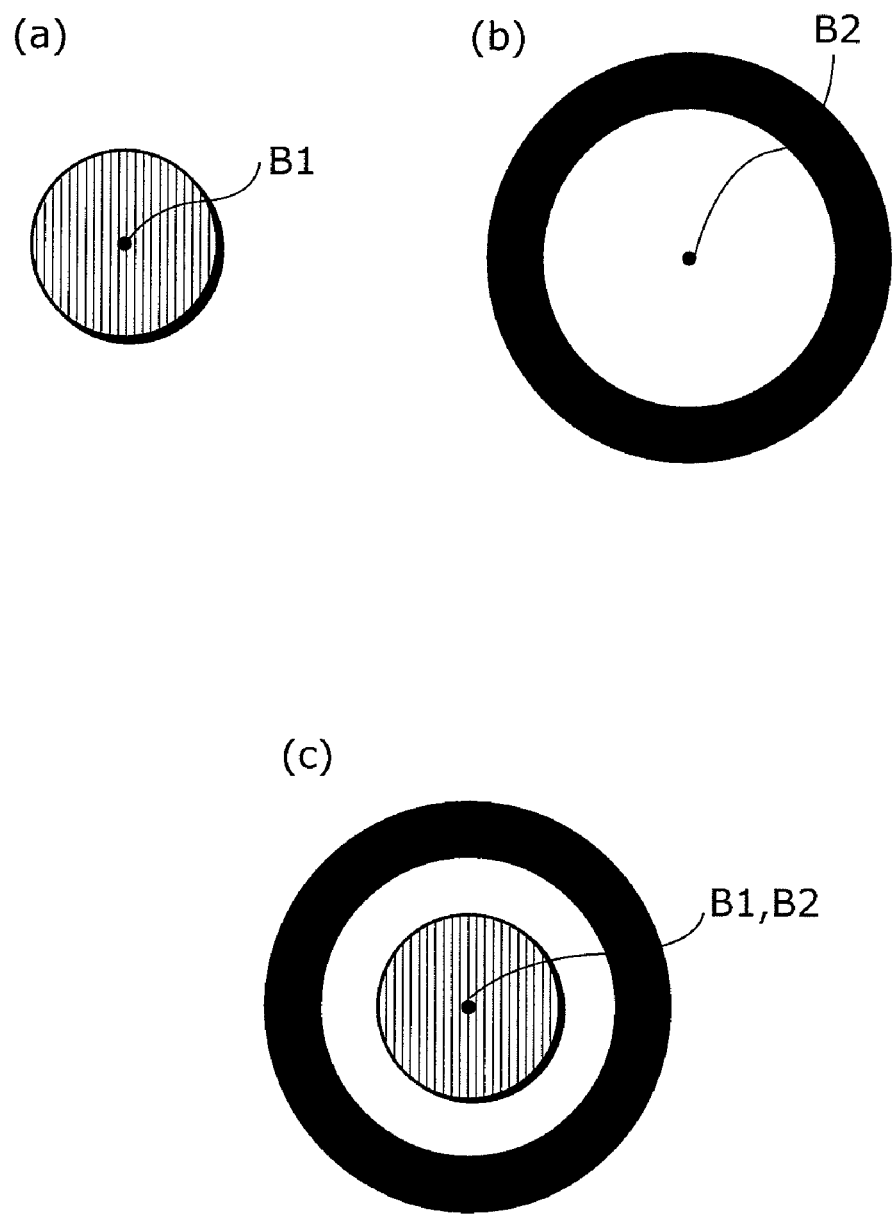
FIG. 7 The part (a) of FIG. 7 shows an example of a component recognition mark. The part (b) of FIG. 7 shows an example of a panel recognition mark. The part (c) of FIG. 7 shows an example of a component recognition mark and a panel recognition mark.

In addition, assume that a component recognition mark as shown in the part (a) of FIG. 7 is formed on the component, a panel recognition mark as shown in the part (b) of FIG. 7 is formed on the panel, and when the component is mounted at a predetermined mounting position on the panel, the component recognition mark and the panel recognition mark have such a positional relationship as shown in the part (c) of FIG. 7. In this case, assuming that the feature point data 441*b* indicates, as feature points, the center of gravity B1 of a circle constituting the component recognition mark and the center of gravity B2 of a circle constituting the panel recognition mark, it is determined whether or not the centers of gravity B1 and B2 of the respective circles are recognizable.

Figure 8:
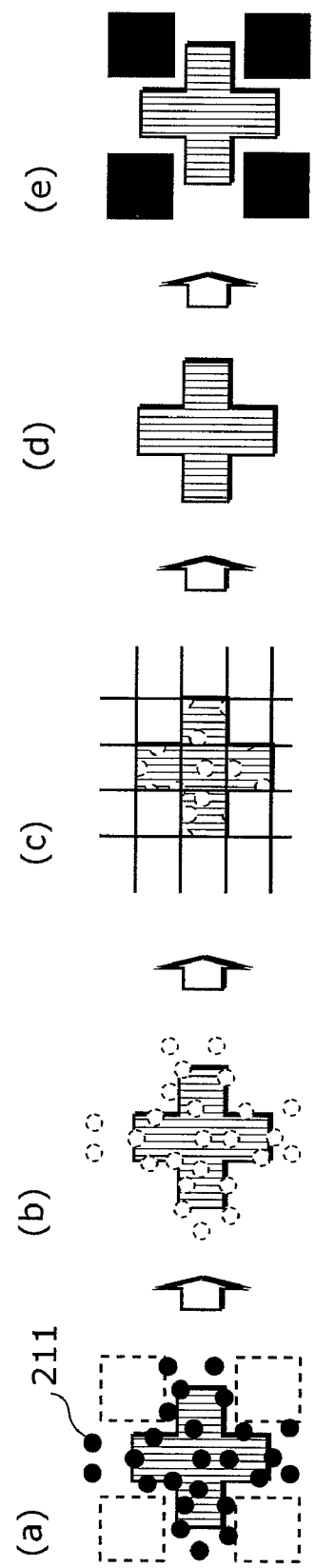
FIG. 8 shows how an inspector of the component mounting system corrects an image.
Figure 9:
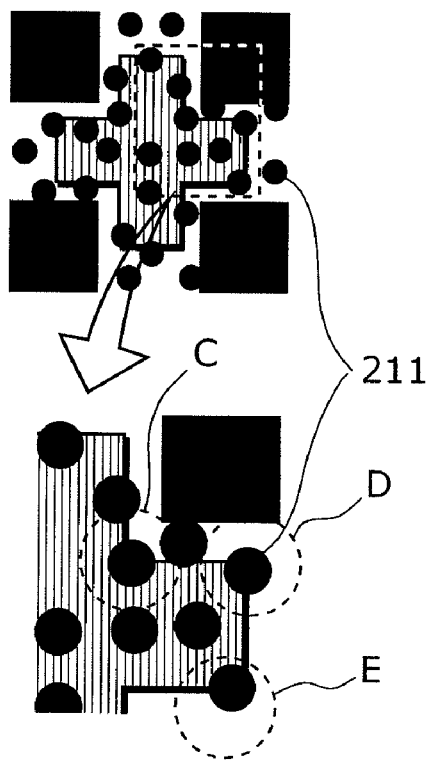
FIG. 9 shows an example of an image captured by a visible light camera.

Next, if it is determined that the captured image of the component recognition mark is not a favorable image (No in Step S12), the control unit 440 of the inspector 105 causes the correction unit 447 to delete the conductive particles 211 of the ACF 210 from the image as shown in the parts (a) and (b) of FIG. 8 (Step S13). For example, as shown in the parts (a) and (b) of FIG. 9, the conductive particles 211 are deleted when the conductive particles 211 overlap feature points C, D, and E of the component recognition mark and make it impossible to recognize the feature points as the feature points are behind the conductive particles 211.

The deletion of the images of the conductive particles 211 from the image involves: storing in advance a plurality of images of the conductive particles 211 in the storage unit 441; comparing the conductive particles 211 in the captured image with the stored images; extracting from the captured image the conductive particles having a high degree of match with the stored images; and deleting the extracted conductive particles as the conductive particles 211. Alternatively, the conductive particles high in circularity, that is, the conductive particles whose length between the center of gravity and the outer edge is within a certain range, are extracted from the captured image, and the extracted conductive particles are deleted as images of the conductive particles 211.

Next, as shown in the part (c) of FIG. 8, the control unit 440 of the inspector 105 causes the correction unit 447 to correct the image from which the conductive particles 211 have been deleted, through either linear interpolation or curve interpolation of the parts from which the conductive particles 211 have been deleted (Step S14).

Next, as shown in the part (d) of FIG. 8, the control unit 440 of the inspector 105 causes the correction unit 447 to further correct the above corrected image through binarization to ensure a clear contrast (Step S15). This gives an image, as shown in the part (e) of FIG. 8, from which the positions of the predetermined feature points of the panel recognition mark and the component recognition mark can be obtained.

Next, if it is determined that the image is a favorable image (Yes in Step S12) or the binarization has been performed on the image, the control unit 440 of the inspector 105 causes the obtaining unit 448 to obtain the positions of the feature points (Step S16). More specifically, the control unit 440 of the inspector 105 causes the obtaining unit 448 to obtain the position of the predetermined feature point of the panel recognition mark and the position of the feature point of the component recognition mark from the image on which the binarization has been performed or from the image determined as favorable.

Next, the control unit 440 of the inspector 105 causes the amount-of-misalignment calculation unit 446 to calculate, as an amount of misalignment of the mounted component, an amount of misalignment of the predetermined feature point of the component recognition mark from a predetermined position that is determined using the position of the feature point of the panel recognition mark as a reference (Step S17). More specifically, the control unit 440 of the inspector 105 causes the amount-of-misalignment calculation unit 446 to calculate the position of the predetermined feature point of the component recognition mark, which is determined using the position of the predetermined feature point of the panel recognition mark as a reference, and to calculate an amount of misalignment of the predetermined feature point of the component recognition mark located at the calculated position, from a predetermined position which is determined using the position of the predetermined feature point of the panel recognition mark as a reference.

Next, the control unit 440 of the inspector 105 causes the communication I/F unit 444 to transmit to the line controller 108 the calculated amount of component misalignment in association with a mounting position indicated in the inspection position data 441*a* (Step S18).

Next, the control unit 410 of the line controller 108 causes the operation unit 415 to update the master table 411*a* stored in the storage unit 411 based on the amount of misalignment received via the communication I/F unit 414 (Step S19).

Next, the control unit 410 of the line controller 108 causes the communication I/F unit 414 to transmit the updated master table 411*a* to the panel mounter 103*a* (Step S20).

Next, the control unit 430 of the panel mounter 103*a* updates the feedback data 431*a* stored in the storage unit 431 based on the master table 411*a* received via the communication I/F unit 434 (Step S21).

Lastly, the control unit 430 of the panel mounter 103*a* executes NC data and causes the mechanical unit 435 to mount the component on the panel (Step S22). The mounting involves correcting the mounting position of the component with the updated feedback data 431*a* taken into account, and mounting the component at the corrected mounting position.

As described above, the inspector 105 according to the present embodiment calculates an amount of component misalignment based on the image of the panel recognition mark and the component recognition mark. This makes it possible to precisely detect the amount of misalignment of the component mounted on the panel through the ACF.

Further, even when the component recognition mark cannot be recognized as a whole due to the conductive particles, the inspector 105 according to the present embodiment makes it possible to calculate the amount of misalignment of the component through image correction and so on. Since the calculation of the amount of component misalignment is free from the impact of the conductive particles, it is possible to reliably detect the amount of misalignment of the component mounted on the panel through the ACF.

Furthermore, the inspector 105 according to the present embodiment performs the binarization after the interpolation on the captured image. Thus, the positions of the feature points can be more accurately obtained, and therefore it is possible to more precisely detect the amount of misalignment of the component mounted on the panel through the ACF.

Thus far, the inspection apparatus and the inspection method according to the present invention have been described above based on an embodiment, but the present invention is not limited to this embodiment. The present invention includes various modifications obvious to a person skilled in the art without departing from the scope of the present invention.

For example, the above embodiment has illustrated that the inspector is provided in the line. However, the panel mounter may have the function of inspecting the mounting-completed panel. In this case, the panel mounter has a visible light illuminator and a visible light camera arranged in the same positional relationship as in the inspector of the above embodiment.

Further, the above embodiment has illustrated that the captured image is corrected if it is determined that the positions of the predetermined feature points indicated in the feature point data are not recognizable. However, the feature point data may indicate plural feature points in order of priority, and the determination unit may first determine whether or not the position of the highest-priority feature point is recognizable, and then, if it is not recognizable, determine whether or not the second-highest-priority feature point is recognizable. In this case, if it is determined that one of the feature points indicated in the feature point data is recognizable, the feature point is obtained (Step S16 in FIG. 5) without correcting the image of the component recognition mark and the panel recognition mark, whereas if it is determined that none of the feature points is recognizable, the correction and the binarization are performed on the image (Steps S13 to 15 in FIG. 5).

Figure 10:
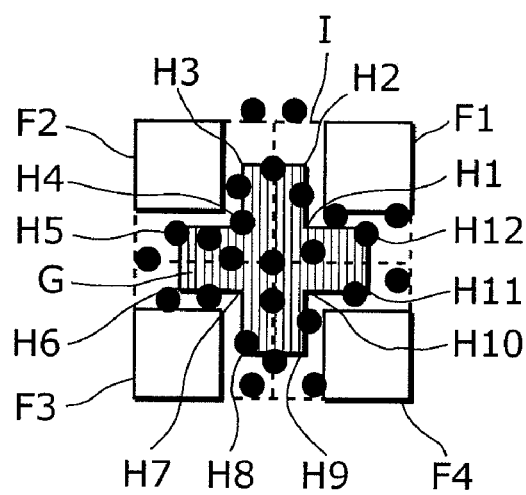
FIG. 10 shows an example of an image captured by a visible light camera.
Figure 11:
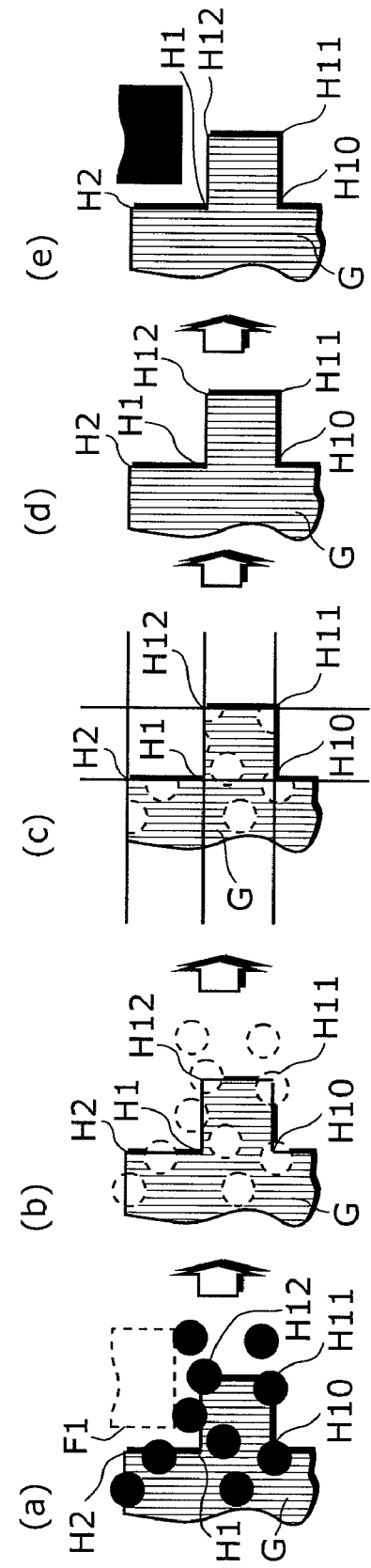
FIG. 11 shows how an inspector of the component mounting system corrects an image.

For example, in the case where a component recognition mark G shown in FIG. 10 is formed on the component, edges H1 to H11 at which straight lines constituting the outline of the component recognition mark G intersect are indicated in the feature point data 441b as feature points. The closer the feature point is to the panel recognition mark, the higher the priority of the feature point it is determined. In the case where the component recognition mark G is made up of separate marks F1 to F4 as shown in FIG. 10, the determination unit divides the captured image into plural areas each including both the panel recognition mark and the component recognition mark, and sequentially determines for the plural areas whether or not the feature points are recognizable. More specifically, first, the determination unit determines whether or not the feature points in a predetermined area I centered on the mark F1 are recognizable, and then sequentially determines whether or not the feature points in predetermined areas centered on the marks F2 to F4 are recognizable. Then, if it is determined that the feature points are not recognizable in any of the areas, the correction and the binarization are performed on one of the areas of the image, e.g., the predetermined area I centered on the mark F1, as shown in FIG. 11 (Steps S13 to S15 in FIG. 5).

Further, the above embodiment has illustrated that the captured image is interpolated and then binarized. The correction through the binarization, however, does not have to be performed, or may be replaced with correction using pattern matching. In the case of performing the pattern matching, an image of the component recognition mark to be used as a matching reference is stored in the storage unit 441 of the inspector 105, and matching is performed between the interpolated image of the component recognition mark and the image of the component recognition mark stored in the storage unit 441.

Furthermore, the above embodiment has illustrated that the inspector is provided with the visible light illuminator and the visible light camera to capture the image of the panel recognition mark and the component recognition mark. However, the present invention is not limited by the above visible light illuminator and visible light camera as long as: the illuminator emits light which allows capturing of the image of the panel recognition mark and the component recognition mark, that is, light having a wavelength which allows the light to pass through the panel but does not allow or does not easily allow the light to pass through the conductive particles; and the camera can receive such light.

Moreover, the above embodiment has illustrated that the inspector is provided with the visible light illuminator and the visible light camera to capture the image of the panel recognition mark and the component recognition mark. However, the visible light illuminator may be replaced with an infrared light illuminator, and the visible light camera may be replaced with an infrared (IR) camera. In this case, the infrared light illuminator and the IR camera are provided on the side of the component's bottom surface (the surface of the component not bonded to the panel), and the infrared light illuminator illuminates the component's bottom surface with infrared light. The component is transparent to infrared light, and thus the infrared light emitted from the infrared light illuminator passes through the component and illuminates the entire surface of the component recognition mark formed on the component's top surface. At this time, the determination unit determines whether or not the predetermined feature points of the component recognition mark and the panel recognition mark are recognizable in the captured image, and the obtaining unit obtains the positions of the predetermined feature points. It is to be noted that the present invention is not limited by the infrared light illuminator and the IR camera as long as: the illuminator emits light which allows capturing of the image of the panel recognition mark and the component recognition mark, that is, light having a wavelength which allows the light to pass through the component but does not allow or does not easily allow the light to pass through the conductive particles; and the camera can receive such light.

In addition, the above embodiment has illustrated that the obtaining unit obtains the position of one feature point from each of the panel recognition mark and the component recognition mark. However, the obtaining unit may obtain the positions of two feature points. This makes it possible also to calculate, as the amount of component misalignment, an amount of shift in the slope of a straight line connecting the two feature points and an amount of misalignment of the respective centers of the two feature points, thereby allowing more precise detection of the amount of misalignment of the component mounted on the panel through the ACF.

Further, the above embodiment has illustrated that the inspector calculates, using the panel recognition mark as a reference, the amount of misalignment of the component recognition mark as the amount of component misalignment. However, an amount of misalignment in a wiring pattern of the component may be calculated as the amount of component misalignment, using a wiring pattern of the panel as a reference.

Furthermore, the above embodiment has illustrated that the inspector corrects the image from which the conductive particles have been deleted. However, the conductive particles do not have to be deleted, and the inspector may correct an image containing the conductive particles. In this case, extracted from the captured image are: divided straight lines in the case where a combination of straight lines constitutes the shape of the recognition mark; and curves having a predetermined radius in the case where the recognition mark has a circular shape. Then, the interpolation is performed to connect the straight lines or to connect the curves.

INDUSTRIAL APPLICABILITY

The present invention can be applied to inspection apparatuses and inspection methods, and particularly to component mounting systems and the like which mount components on panels.

The invention claimed is:

1. An inspection apparatus which detects an amount of misalignment, from a predetermined mounting position, of a component mounted on a surface of a panel through an adhesive which contains conductive particles, said inspection apparatus comprising:
   a camera which captures an image of a panel recognition mark formed on the panel and a component recognition mark formed on the component;
   an obtaining unit configured to obtain, from the image captured by said camera, a position of a feature point of the panel recognition mark and a position of a feature point of the component recognition mark;
   a calculation unit configured to calculate an amount of misalignment of the feature point of one of the panel recognition mark and the component recognition mark in the image from a predetermined position that is determined using the position of the feature point of the other one of the recognition marks as a reference;
   a determination unit configured to determine whether or not the feature point of the panel recognition mark and the feature point of the component recognition mark are recognizable in the image; and
   a correction unit configured to correct the image when said determination unit determines that the feature points are not recognizable,
   wherein said obtaining unit is configured to obtain the positions of the feature points from either the image for which said determination unit has determined that the feature points are recognizable or the image corrected by said correction unit, and
   when said determination unit determines that the feature points are not recognizable, said correction unit is configured to delete the conductive particles from the image and perform either linear interpolation or curve interpolation of a part of the image from which the conductive particles have been deleted.

2. An inspection method for detecting an amount of misalignment, from a predetermined mounting position, of a component mounted on a surface of a panel through an adhesive which contains conductive particles, said inspection method comprising:
   capturing, by a camera, an image of a panel recognition mark formed on the panel and a component recognition mark formed on the component;
   obtaining, from the image captured by the camera, a position of a feature point of the panel recognition mark and a position of a feature point of the component recognition mark;
   calculating an amount of misalignment of the feature point of one of the panel recognition mark and the component recognition mark in the image from a predetermined position that is determined using the position of the feature point of the other one of the recognition marks as a reference;
   determining whether or not the feature point of the panel recognition mark and the feature point of the component recognition mark are recognizable in the image; and
   correcting the image when it is determined in said determining that the feature points are not recognizable,
   wherein in said obtaining, the positions of the feature points are obtained from either the image for which it has been determined in said determining that the feature points are recognizable or the image corrected in said correcting, and
   in said correcting, the conductive particles are deleted from the image, and either linear interpolation or curve interpolation of a part of the image from which the conductive particles have been deleted is performed when it is determined in said determining that the feature points are not recognizable.

3. A component mounting system comprising:
   a mounting apparatus which mounts a component on a panel; and
   an inspection apparatus which detects an amount of misalignment, from a predetermined mounting position, of the component mounted on a surface of the panel through an adhesive which contains conductive particles,
   wherein said component mounting system corrects, based on the amount of misalignment, a mounting position of the component mounted by said mounting apparatus, and
   said inspection apparatus includes:
   a camera which captures an image of a panel recognition mark formed on the panel and a component recognition mark formed on the component;
   an obtaining unit configured to obtain, from the image captured by said camera, a position of a feature point of the panel recognition mark and a position of a feature point of the component recognition mark;
   a calculation unit configured to calculate an amount of misalignment of the feature point of one of the panel recognition mark and the component recognition mark in the image from a predetermined position that is determined using the position of the feature point of the other one of the recognition marks as a reference;
   a determination unit configured to determine whether or not the feature point of the panel recognition mark and the feature point of the component recognition mark are recognizable in the image; and
   a correction unit configured to correct the image when said determination unit determines that the feature points are not recognizable,
   wherein said obtaining unit is configured to obtain the positions of the feature points from either the image for which said determination unit has determined that the feature points are recognizable or the image corrected by said correction unit, and when said determination unit determines that the feature points are not recognizable, said correction unit is configured to delete the conductive particles from the image and perform either linear interpolation or curve interpolation of a part of the image from which the conductive particles have been deleted.

4. A component mounting method performed by a component mounting system which includes:
- a mounting apparatus which mounts a component on a panel; and
- an inspection apparatus which detects an amount of misalignment, from a predetermined mounting position, of the component mounted on a surface of the panel through an adhesive which contains conductive particles, said component mounting method being a method for correcting a mounting position of the component in the mounting apparatus based on the amount of misalignment, and comprising:

capturing, by a camera, an image of a panel recognition mark formed on the panel and a component recognition mark formed on the component;

obtaining, from the image captured by the camera in said capturing, a position of a feature point of the panel recognition mark and a position of a feature point of the component recognition mark;

calculating an amount of misalignment of the feature point of one of the panel recognition mark and the component recognition mark in the image from a predetermined position that is determined using the position of the feature point of the other one of the recognition marks as a reference;

determining whether or not the feature point of the panel recognition mark and the feature point of the component recognition mark are recognizable in the image; and correcting the image when it is determined in said determining that the feature points are not recognizable, wherein in said obtaining, the positions of the feature points are obtained from either the image for which it has been determined in said determining that the feature points are recognizable or the image corrected in said correcting, and in said correcting, the conductive particles are deleted from the image, and either linear interpolation or curve interpolation of a part of the image from which the conductive particles have been deleted is performed when it is determined in said determining that the feature points are not recognizable.

* * * * *